United States Patent [19]
Daido et al.

[11] Patent Number: 4,871,039
[45] Date of Patent: Oct. 3, 1989

[54] POWER STEERING SYSTEM INCORPORATING ELECTRIC MOTOR

[75] Inventors: Toshihiko Daido; Mitsugu Fujiwara; Shigeo Nishimura, all of Osaka, Japan

[73] Assignee: Koyo Seiko Co., Ltd., Osaka, Japan

[21] Appl. No.: 174,911

[22] Filed: Mar. 29, 1988

[30] Foreign Application Priority Data

Apr. 3, 1987 [JP] Japan .................................. 62-83536

[51] Int. Cl.$^4$ ............................................. B62D 5/04
[52] U.S. Cl. ................................ 180/79.1; 364/424.05
[58] Field of Search .......... 180/79.1; 364/424, 424.05; 74/388 PS

[56] References Cited

U.S. PATENT DOCUMENTS

| | | | |
|---|---|---|---|
| 4,471,280 | 9/1984 | Stack | 180/79.1 |
| 4,653,601 | 3/1987 | Nakamura et al. | 180/79.1 |
| 4,664,211 | 5/1987 | Oshita et al. | 180/79.1 |
| 4,676,331 | 6/1987 | Iwaki et al. | 180/79.1 |
| 4,681,183 | 7/1987 | Oshita | 180/79.1 |
| 4,685,528 | 8/1987 | Suzuki et al. | 180/79.1 |
| 4,708,220 | 11/1987 | Noto et al. | 180/79.1 |
| 4,736,810 | 4/1988 | Morishita et al. | 180/79.1 |

FOREIGN PATENT DOCUMENTS

| | | | |
|---|---|---|---|
| 122078 | 6/1986 | Japan | 180/79.1 |
| 125964 | 6/1986 | Japan | 180/79.1 |

Primary Examiner—Charles A. Marmor
Assistant Examiner—Karin Tyson
Attorney, Agent, or Firm—Armstrong, Nikaido, Marmelstein, Kubovcik & Murray

[57] ABSTRACT

A power steering system having an electric motor and including an input shaft fixed to a steering wheel, an output shaft coupled to the motor via a reduction gear, and a torsion bar provided between the input and output shafts, the output shaft being rotatable by the resultant of a manual torque for rotating the wheel and the torque of the motor. The system comprises a sensor for detecting the relative angular displacement between the input shaft and the output shaft, and a microcomputer having stored therein the relationship between the relative angular displacement and the motor current target value for determining the direction of rotation of the motor and a motor current target value from the output of the sensor to produce outputs. The relationship stored in the microcomputer is a nonlinear relationship wherein variations in the motor current target value with the relative angular displacement are small in the range of small relative angular displacements but are great in the range of great displacements.

2 Claims, 4 Drawing Sheets

POWER STEERING SYSTEM INCORPORATING ELECTRIC MOTOR

BACKGROUND OF THE INVENTION

The present invention relates to a power steering system having an electric motor incorporated therein, and more particularly to a power steering system comprising an input shaft fixed to a steering wheel, an output shaft coupled to an electric motor via a reduction gear, and a torsion bar provided between the input and output shafts, such that the output shaft is rotatable by the resultant of a torque for the person to rotate the steering wheel and the torque of the motor.

In the specification, the torque for the person to rotate the steering wheel will be referred to as an "input torque," the torque of the motor as an "auxiliary torque," and the resultant torque as a "steering torque."

Such a power steering system is known which comprises means for detecting the input torque, and control means for for controlling the auxiliary torque, i.e. the current through the motor, in accordance with the output of the detecting means (see Unexamined Japanese Patent Publication No. SHO 59-77966). The conventional system involves a linear relation between the input torque and the motor current target value as shown in FIG. 6 and therefore has the following problem. The steering torque involved in stopping a motor vehicle differs greatly from that required during running, and stopping requires a greater torque than running. With the conventional motor-incorporating power steering system, however, the input torque has a linear relationship with the motor current target value, so that if a suitable magnitude of auxiliary torque is set for stopping, the auxiliary torque during running becomes excessive to make the steering wheel feel too light to handle, whereas when the steering toque is set to a suitable magnitude for running, too small a torque will result to make the wheel feel heavier when the vehicle is to be stopped. Accordingly, it has been proposed to control the steering torque in response to the speed of the vehicle, but this mode of control generally encounters difficulties in a very low speed range because of the limitations imposed on the speed sensor and signal detection circuit.

SUMMARY OF THE INVENTION

An object of the present invention is to provide a power steering system for producing a suitable auxiliary torque when the motor vehicle is to be stopped and also during driving so as to render the steering wheel operable suitably.

Another object of the invention is to preclude vibration of the steering system.

The present invention provides a power steering system having an electric motor incorported therein and including an input shaft fixed to a steering wheel, an output shaft coupled to the motor via a reduction gear, and a torsion bar provided between the input and output shafts, the output shaft being rotatable by the resultant of a torque for the person to rotate the steering wheel and the torque of the motor, the system being characterized in that it comprises:

a sensor for detecting the relative angular displacement between the input shaft and the output shaft, and a microcomputer having stored therein the relationship between the relative angular displacement and the motor current target value for determining the direction of rotation of the motor and a motor current target value from the output of the sensor to produce outputs, the relationship stored in the microcomputer being a nonlinear relationship wherein variations in the motor current target value with the relative angular displacement are small in the range of small relative angular displacements but are great in the range of great relative angular displacements.

Based on the stored relationship between the angular displacement between the input and output shafts and the motor current target value, the microcomputer determines the direction of rotation of the motor and the desired motor current target value from the relative angular displacement detected by the sensor and produces outputs representing the result, thereby causing the motor to produce an auxiliary torque corresponding to the angular displacement between the input and outpust shafts, i.e., the input torque. The relationship stored in the microcomputer is nonlinear as stated above, so that when the relative angular displacement is great as when the vehicle is to be stopped, a great auxiliary torque is produced to render the steering wheel easy to handle, whereas when the relative angular displacement is small as during running, the auxiliary torque is reduced not to make the wheel too light. Thus, the steering wheel can be handled optimally for stopping and also for driving.

Preferably, the operating time interval after the microcomputer has detected an input from the sensor until it detects another input following the production of a motor current target value is up to 2 milliseconds, and the operating time interval required for the production of the target value after the detection of the input is up to 500 microseconds.

If the operating time interval from the detection by the microcomputer of an input from the sensor until the detection of the subsequent input and the operating time interval from the detection of the input until the production of the target value are longer, vibration occurs in the steering system, whereas such vibration can be obviated when these time intervals are up to 2 milliseconds and up to 500 microseconds, respectively.

DESCRIPTION OF THE PREFERRED EMBODIMENT

Figure 1:
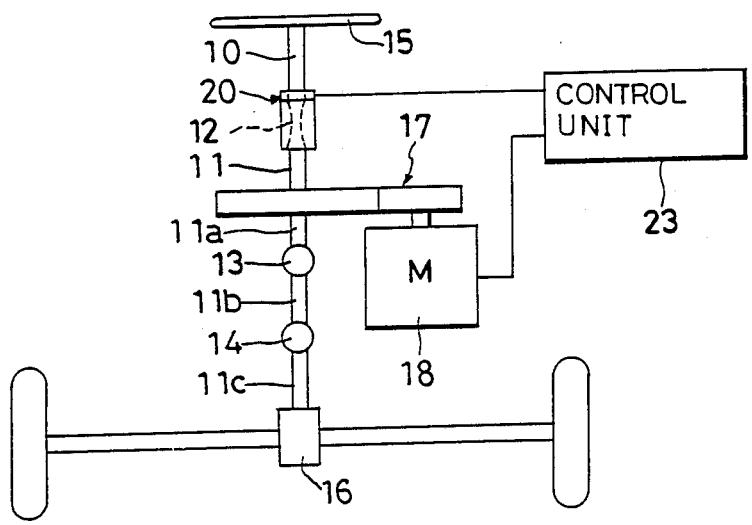
FIG. 1 is a diagram schematically showing the construction of a power steering system incorporating an electric motor and embodying the invention.
Figure 2:
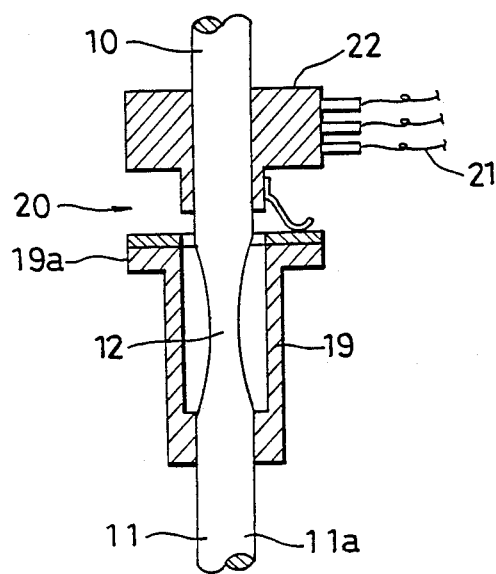
FIG. 2 is an enlarged fragmentary view in vertical section of FIG. 1 showing a relative angular displacement sensor.

FIG. 1 is a diagram showing a power steering system incorporating an electric motor, and FIG. 2 is an enlarged fragmentary view of the same.

Figure 4:
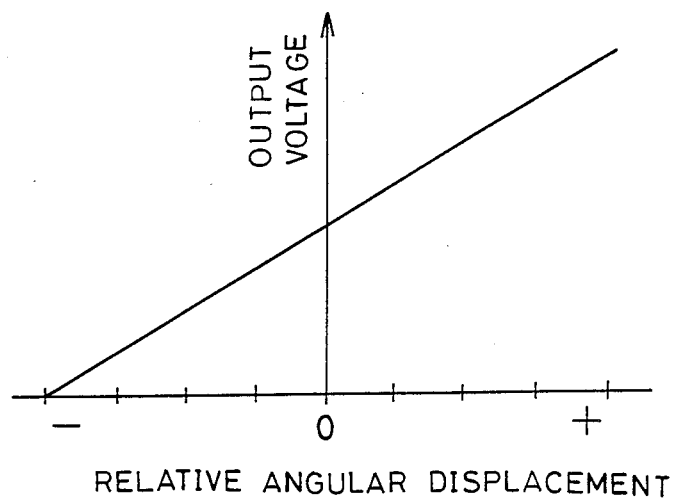
FIG. 4 is a graph showing the relationship between the relative angular displacement and the output voltage of the sensor.

The power steering system has a steering shaft which is divided generally into an input shaft 10 and an output shaft 11, and a torsion bar 12 is provided therebetween. The output shaft 11 comprises three portions which are interconnected by universal joints 13 and 14, i.e., an upper output shaft 11a, an intermediate output shaft 11b and a lower output shaft 11c. The input shaft 10 has a steering wheel 15 fixed thereto. The lower output shaft 11c is connected to a rack-pinion steering gear assembly 16. Via a suitable reduction gear 17, a d.c. servomotor 18 is coupled to a suitable portion of the output shaft 11, for example, to the upper output shaft 11a. As shown in greater detail in FIG. 2, a tubular member 19 provided around the torsion bar 12 and extending toward the input shaft 10 has on end secured to the upper end of the upper output shaft 11a. A relative angular displacement sensor 20 comprising a potentiometer is provided between a flange 19a of the tubular member 19 and the lower end of the input shaft 10. The sensor 20 has output wires 21 extending outward through a split ring 22 and connected to a control unit 23 for controlling the motor 18. The sensor 20 detects the input torque, i.e., the relative angular displacement between the input shaft 10 and the output shaft 11. With reference to FIG. 4, the output voltage of the sensor 20 varies linearly with the relative angular displacement. The zero point of the displacement is a neutral point. where the input torque is zero. The positive displacement stands for the forward direction of rotation, and the negative displacement for the reverse direction.

Figure 3:
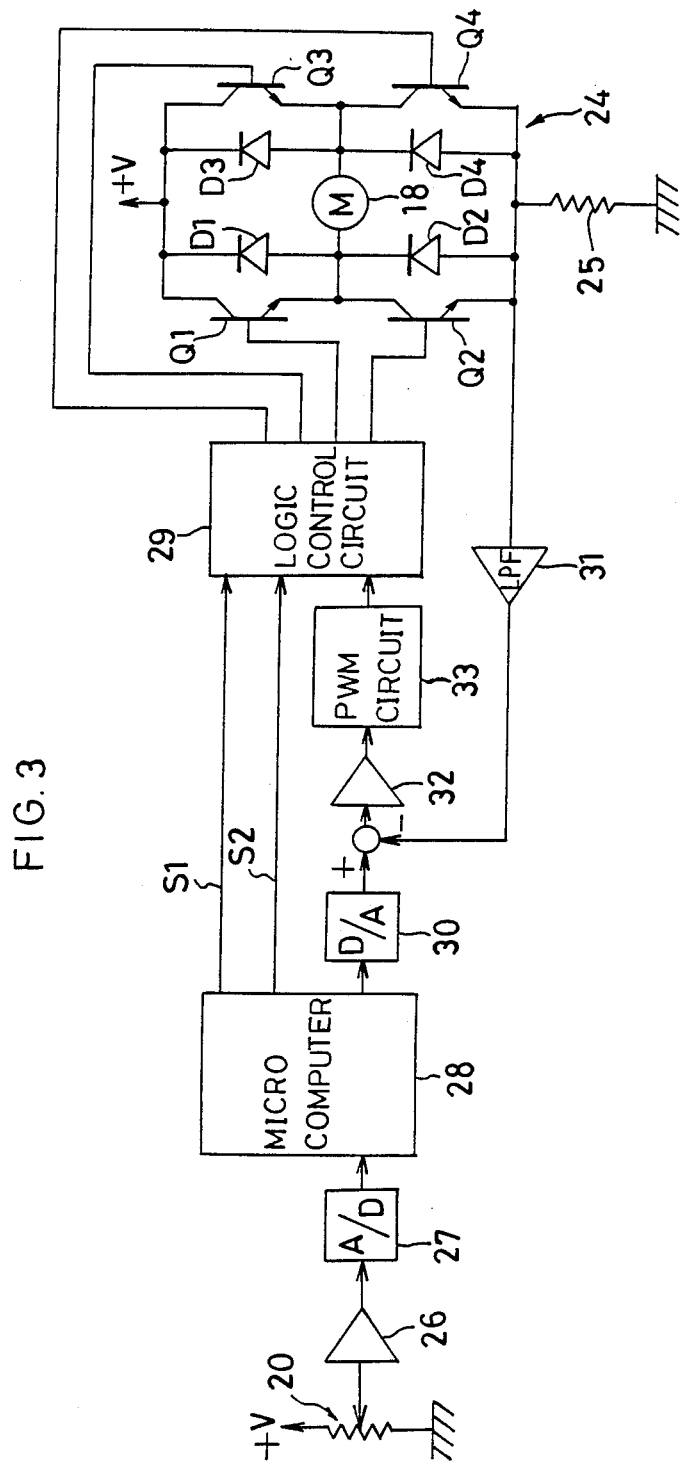
FIG. 3 is a block diagram showing the electrical construction of a control unit.

FIG. 3 shows the contruction of the control unit 23 for illustrative purposes.

The motor 18 is connected to a control circuit 24 including four diodes D1, D2, D3, D5 and four switching transistors Q1, Q2, Q3, Q4. A resistor 25 for detecting the motor current is connected to the control circuit 24. The motor control circuit 24 itself is already known. Only while the first and fourth transistors Q1, Q4 are in conduction, a forward current flows to rotate the motor 18 forward. Only while the second and third transistors Q2, Q3 are in conduction, a reverse current flows, rotating the motor 18 reversely. The current value of the motor 18, i.e. the auxiliary torque, is controlled by controlling the duration of conduction of the transistors Q1 to Q4.

Figure 5:
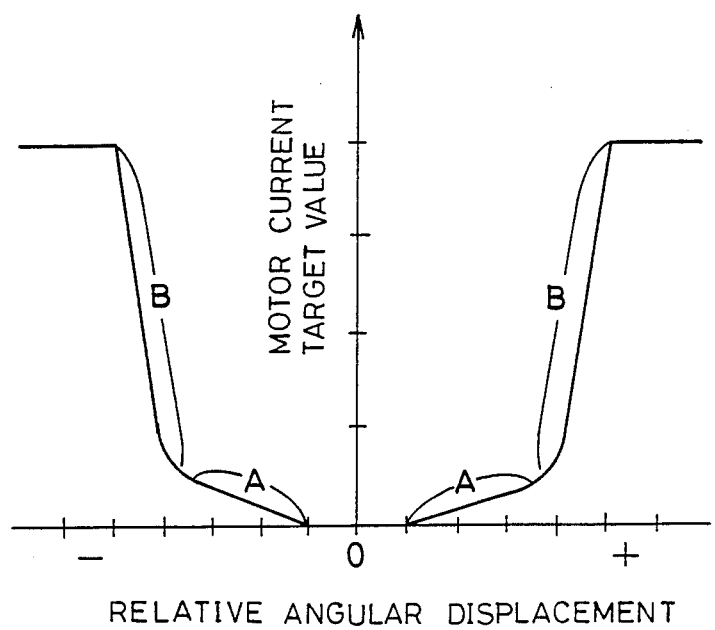
FIG. 5 is a graph showing the relationship between the relative angular displacement and the motor current target value.
Figure 6:
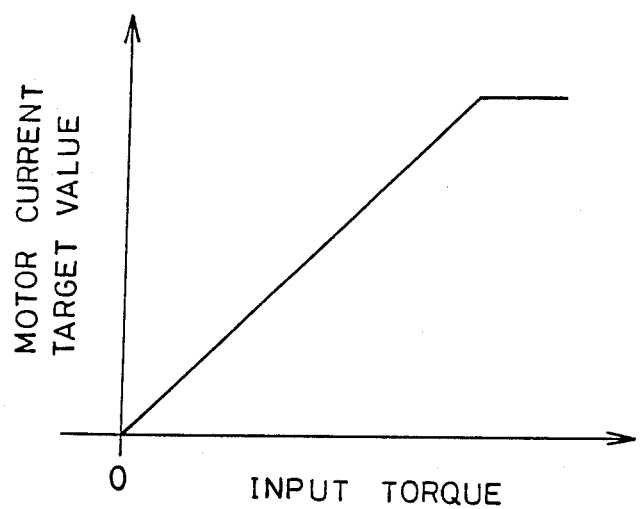
FIG. 6 is a graph showing the relationship between the input torque and the motor current target value as established with a conventional system.

On the other hand, the output of the angular displacement sensor 20 is fed to a microcomputer 28 via an amplifier 26 and an AD converter 27. The microcomputer 28 has stored therein the above-mentioned relationship between the output of the sensor 20 and the relative angular displacement shown in FIG. 4 and the relationship between the relative angular displacement and the motor current target value shown in FIG. 5. The relationship shown in FIG. 5 is nonlinear, such that the graph representing variations in the motor current target value at varying relative angular displacements has a small slope in the range A of small displacements but a great slope in the range F of great displacements. With motor vehicles, the input torque, i.e. the relative angular displacement, is greatest when the vehicle is to be stopped and decreases as the speed increases, so that the range A of small relative angular displacements will be referred to as a high-speed range, and the range B of great relative angular displacements as a low-speed range.

The output of the sensor 20, as converted by the AD converter 27, is fed to the microcomputer 28, which determines the direction of rotation of the motor 18 and a proper motor current target value based on the relationships of FIGS. 4 and 5 and produces outputs representing the result. The microcomputer 28 performs this operation, i.e. detection of the input from the sensor 20 through the production of the target value, within 500 microseconds, and repeatedly conducts the operation at a predetermined time interval of up to 2 milliseconds. Stated more specifically, the microcomputer 28 first determines the direction and value of the relative angular displacement from the AD-converted output of the sensor 20 with reference to the relationship of FIG. 4 and feeds to a logic control circuit 29 a rotational direction signal S1 or S2 indicating the direction of the angular displacement. The positive rotational direction signal S1 is given when the relative angular displacement is positive, or the negative rotational direction signal S2 is given when the displacement is negative. The microcomputer further determines the proper motor current target value from the value of angular displacement thus obtained, with reference to the relationship of FIG. 5 and feeds the resulting output to a DA converter 30. The output of the DA converter 30 is fed to an error amplifier 32 along with a feedback signal obtained from the voltage (proportional to the motor current) across the resistor 25 of the motor control circuit 24 by smoothing with a low-pass filter 31 and amplification. The output of the error amplifier 32 is given to a pulse-width modulation (PWM) circuit 33, which produces an output with a pulse width varying with the output of the amplifier 32. The output of the circuit 33 is applied to the logic control circuit 29.

The logic control circuit 29 controls the rotational direction of the motor 18 and the motor current in the following manner in accordance with the rotational direction signal S1 or S2 from the microcomputer 28 and with the output of the PWM circuit 33. In response to the positive direction signal S1 from the microcomputer 28 and while the pulse signal is given by the PWM circuit 33, the circuit 29 holds the first and fourth transistors Q1, Q4 in conduction to rotate the motor 18 forward. Alternatively, when the negative direction signal S2 is given and while the pulse signal is delivered from the circuit 33, the second and third transistors Q2, Q3 are held in conduction to rotate the mortor 18 in the reverse direction. In either case, the motor current is made equal to the target value produced from the microcomputer 28. The PWM circuit 33 and the logic control circuit 29 per se are each of known construction.

Since the motor current target value is determined by the microcomputer 28 based on the nonlinear relationship as shown in FIG. 5, the steering wheel can be handled suitably for stopping or for driving. When the input torque is great (low-speed range B in FIG. 5) as when the steering wheel is handled at rest, the motor current target value is great to produce a great auxiliary torque, making the wheel feel light for smooth steering at rest. Conversely, while the input torque is small (high-speed range A in FIG. 5) as during running, the motor current target value is small to give a small auxiliary torque so as not to render the steering wheel too light to handle.

When the microcomputer is used, the operating time involving AD conversion and calculation and required for producing an output after the detection of an input is waste time from the viewpoint of control. If this period of time and also the operating time interval from the detection of the AD-converted input until the detection of the subsequent input following production of the output are long, a phase lag occurs between the AD-converted input signal and the computer output signal to result in a phase lag between the input torque and the auxiliary torque, giving rise of the vibration of the steering system. Nevertheless, the present embodiment obviates the vibration because the operating time interval required for the production of the output after the detection of the relative angular displacement is up to 500 microseconds and further because the operating time interval from the detection of the input until the detection of the subsequent input following the production of the output is as short as up to 2 milliseconds.

While the invention has been particularly shown and described in reference to preferred embodiments thereof, it will be understood by those skilled in the art that changes in form and details may be made therein without departing from the spirit and scope of this invention.

What is claimed is:

1. A power steering system having an electric motor incorporated therein and having an input shaft fixed to a steering wheel, an output shaft coupled to the motor via a reduction gear, and a torsion bar provided between the input and output shafts, wherein the output shaft being rotatable by a resultant torque from a rotation of the steering wheel by a person and the torque of the motor, the power steering system comprising:
   a sensor means for detecting the relative angular displacement between the input shaft and the output shaft; and
   a microcomputer means having stored therein the relationship between the relative angular displacement and the current target value for determining the direction of rotation of the motor and a motor current target value from the output of the sensor means to produce output signals, wherein the microcomputer means for operating at a time interval of up to 2 milliseconds from the detection of an input from the sensor means to the detection of another input therefrom following the production of the motor current target value, and for operating at a time interval of up to 500 microseconds from the detection of the input until the production of the target value.

2. A system as defined in claim 1, wherein the relationship stored in the microcomputer means being of a nonlinear relationship, wherein variations in the motor current target value with the relative angular displacement are small in the range of small relative angular displacements but are great in the range of great relative angular displacements.

* * * * *